(12) United States Patent
Groppo et al.

(10) Patent No.: US 9,939,007 B2
(45) Date of Patent: Apr. 10, 2018

(54) LOCKING DEVICE MADE AS A NUT OR BOLT

(71) Applicants: Lazzaro Groppo, Sanfre' (IT); Matteo Groppo, Sanfre' (IT)

(72) Inventors: Lazzaro Groppo, Sanfre' (IT); Matteo Groppo, Sanfre' (IT)

( * ) Notice: Subject to any disclaimer, the term of this patent is extended or adjusted under 35 U.S.C. 154(b) by 0 days.

(21) Appl. No.: 15/042,234

(22) Filed: Feb. 12, 2016

(65) Prior Publication Data
US 2016/0238059 A1    Aug. 18, 2016

(30) Foreign Application Priority Data
Feb. 16, 2015    (IT) ............................... TO2015A0100

(51) Int. Cl.
*F16B 37/14*    (2006.01)
*F16B 39/00*    (2006.01)
*F16B 11/00*    (2006.01)

(52) U.S. Cl.
CPC .............. *F16B 37/14* (2013.01); *F16B 39/00* (2013.01); *F16B 11/006* (2013.01)

(58) Field of Classification Search
CPC ...... F16B 11/006; F16B 37/14; F16B 37/145; F16B 39/00
USPC .......... 411/259, 265, 337, 372.5–372.6, 373, 411/375, 429
See application file for complete search history.

(56) References Cited

U.S. PATENT DOCUMENTS 1,937,715 A * 12/1933 Poplin ...................... H01R 4/70
174/139
2,877,817 A * 3/1959 Rockwell .............. F16B 37/122
411/106
4,764,070 A * 8/1988 Baltzell ................... F16B 37/14
411/375
5,302,069 A * 4/1994 Toth .......................... B60B 7/00
411/373
5,324,148 A * 6/1994 Notaro ..................... F16B 35/00
411/373
5,772,377 A * 6/1998 Bydalek ................... F16B 37/14
411/375

(Continued)

FOREIGN PATENT DOCUMENTS

EP    2469106 A1    6/2012
GB    2220244 A    1/1990

OTHER PUBLICATIONS

Italian Search Report and Written Opinion issued in connection with counterpart co-pending Italian Patent Application TO2015A000100.

*Primary Examiner* — Roberta S Delisle
(74) *Attorney, Agent, or Firm* — Howson & Howson LLP

(57) ABSTRACT

Locking device made as a nut (111) provided with an axial threaded seat or bore (115) or as a bolt (11) provided with a cylindrical axial threaded stem (15), comprising a body (13; 113; 213) in which a guide portion (17; 217) is defined, which may also be an engaging portion, for an actuating wrench for rotating the nut or bolt when the device is to be engaged onto a threaded stem or into a threaded seat or bore, respectively, wherein the guide portion (17; 217) comprises a hollow cap (19; 219), and wherein the guide portion (17; 217) comprises at least one face (27) which is concave relative to a transverse plane and in that the cap (19; 219) comprises in its inside at least one complementary convex face (29).

8 Claims, 9 Drawing Sheets

(56) References Cited

U.S. PATENT DOCUMENTS

| | | | | |
|---|---|---|---|---|
| 6,036,420 A * | 3/2000 | Somers | ................... | F16B 37/14 |
| | | | | 411/375 |
| 6,074,148 A * | 6/2000 | Wilson | ................... | F16B 37/14 |
| | | | | 411/375 |
| 6,102,488 A * | 8/2000 | Wilson | ...................... | B60B 3/16 |
| | | | | 301/35.623 |
| 6,293,744 B1 * | 9/2001 | Hempfling | ............. | F16B 43/001 |
| | | | | 411/372.5 |
| 6,827,539 B2 * | 12/2004 | Somers | ................... | F16B 37/14 |
| | | | | 411/375 |
| 6,866,457 B2 * | 3/2005 | Wilson | ................... | F16B 37/14 |
| | | | | 411/373 |
| 7,004,700 B2 * | 2/2006 | Wilson | .................. | F16B 41/005 |
| | | | | 301/37.374 |
| 7,435,045 B2 * | 10/2008 | Wilson | ................... | F16B 37/14 |
| | | | | 411/375 |
| 8,333,537 B2 * | 12/2012 | Rogers | ................... | F16B 31/02 |
| | | | | 301/35.622 |
| 8,491,247 B2 * | 7/2013 | Wilson | ................ | F16B 23/0038 |
| | | | | 411/337 |
| 2003/0035701 A1 | 2/2003 | Hui | | |
| 2007/0189878 A1 * | 8/2007 | Wilson | ................... | F16B 37/14 |
| | | | | 411/429 |
| 2008/0166203 A1 | 7/2008 | Reynolds et al. | | |
| 2013/0149071 A1 | 6/2013 | Davis et al. | | |
| 2013/0216330 A1 * | 8/2013 | Milligan | ................ | F16B 37/14 |
| | | | | 411/429 |

* cited by examiner

LOCKING DEVICE MADE AS A NUT OR BOLT

BACKGROUND

The invention relates to a locking device that can be made as a nut or bolt. More particularly, though not exclusively, the invention relates to a locking device made as a nut or bolt for a vehicle wheel.

Locking devices made as nuts or bolts are known in the art. Such locking devices usually comprise a cylindrical body having either a longitudinal threaded bore, when the device is made as a nut, or a longitudinal threaded stem, when the device is made as a bolt. The bore can be a blind bore or a through bore, depending on the applications. Still according to prior art, the cylindrical body is further provided with an engaging portion for an actuating wrench, which allows to rotate the device. The engaging portion usually has a hexagonal cross-section and can therefore be engaged by a standard wrench of a fixed type with hexagonal cross-section. The wrench may possibly be mounted on a screwing device, for instance a pneumatic one. The wrench is guided in its engagement configuration by the engaging portion itself, which therefore also acts as a guide portion. When the device is in use, i.e. when it is engaged with a threaded stud or in a threaded seat, depending on whether the device is a nut or a bolt, respectively, the engaging portion usually remains visible from the outside, as it has to be accessible for the actuating wrench. For example, when the nut or bolt is engaged on or respectively in a vehicle wheel hub, the engaging portion remains visible on the outside of the wheel rim.

In some applications, for example in the automotive field, the need exists to make the engaging portion of the locking device aesthetically pleasing. This result can be obtained by means of treatments of different kind that are applied either to the whole body of the device or only to the engaging portion. For instance, the engaging portion of the device, when made of steel, can be subjected to a chromium plating treatment. Alternatively, the engaging portion can be varnished. As a further alternative, the engaging portion can be coated with a metal or plastic material. In this last instance, the coating can either adhere to the outer surface of the engaging portion or consist of a hollow cap which is press-fitted with interference onto the engaging portion. In some cases it is known to apply, between the cap and the engaging portion, a curable adhesive, which significantly improves the fixing of the two components. Fixing of the cap to the engaging portion must indeed be such as to prevent the cap from becoming detached from the device body as a consequence of the applied moment when a rotation torque is applied by the actuating wrench. GB 2378740 describes an example of this kind of arrangement. According to prior art, the cap can be made of various materials, for instance aluminum or chrome-plated steel.

One of the drawbacks of the known devices provided with caps results from the tendency of the cap to become detached from the device body, especially when the device must be thoroughly screwed with the locking torque prescribed by the manufacturing company of a vehicle. During locking and unlocking of the device, for instance when the device is applied to a vehicle wheel, the force applied to the cap tends to rotate the cap relative to the outer surface of the engaging portion. Notwithstanding the press-fitting and the adhesive employed by some manufacturers, this drawback is not entirely eliminated. Furthermore, the force applied to the cap by means of the actuating wrench often causes deterioration of the aesthetical features of the cap. For example, in the case of a chrome-plated cap, it often happens that the cap becomes scratched or even cracked when the torque necessary for locking the device according to the established safety parameters is applied.

In other applications, the engaging portion serves solely as guide portion and in the device body there is provided an engaging groove for an actuating wrench provided with a projection complementary to the groove. The actuating wrench is guided to engage into the groove by the guide portion. This is the case of the so-called anti-theft devices. These devices are especially widespread in the automotive field, where they are used against theft of wheel rims. The guide portion usually consists of a bushing which is idly rotatable relative to the device body. The engaging groove for the wrench is usually provided either in a radial portion of the device located at the base of the bushing, or at the center of the bushing. In the first instance the bushing is usually a blind bushing, whereas in the second instance it comprises an open face for allowing access to the groove. Examples of anti-theft devices of the described kind can be found in EP2469106 (A1). The bushing is usually cylindrical and has a smooth outer surface. There is, however, the need to make the bushing with a different kind of outer surface, for instance with a hexagonal cross-section. In some applications, especially in the automotive field, it is indeed necessary, for aesthetical reasons, that the device is outwardly identical to a conventional nut or bolt, in particular of a hexagonal type, mounted on the same wheel.

A first object of the invention is to provide a locking device that has a cap covering the guide and engaging portion for the actuating wrench and does not exhibit the drawbacks of the prior art. Another object of the invention is to provide a device of the aforementioned type that can be made either as a nut or as a bolt. A further object of the invention is to provide a locking device that is aesthetically pleasing and maintains its aesthetical features even after heavy use. A not least object of the invention is to provide a nut or bolt that can be manufactured industrially at low cost. Another object of the invention is to provide an anti-theft locking device that attains the objects set forth above.

These and other objects are achieved by the locking device made as a nut or bolt as claimed in the appended claims.

SUMMARY

The locking device according to the invention is made as a threaded nut or bolt. The locking device can also be made as an anti-theft nut or bolt. When it is made as a nut, the device comprises a cylindrical body having a longitudinal threaded bore. The bore can be a thorough bore or a blind bore. When it is made as a bolt, the device comprises a cylindrical body having a longitudinal threaded stem. The device according to the invention comprises a cylindrical portion extending coaxially relative to the threaded bore or stem. The cylindrical portion serves as a guide portion and possibly also as an engaging portion for an actuating wrench for rotating the device. The wrench allows to rotate the device and lock the same with a certain locking torque by engaging it either onto a threaded stem, for example a stud of vehicle wheel hub, or into a threaded bore, for example of a vehicle wheel hub. The device can be made in an anti-theft version. In this case the cylindrical portion serves solely as a guide for the wrench and preferably comprises a bushing. The bushing can be of the type idly rotatable relative to the vehicle body or it can be fragile and susceptible to break or permanently deform when subjected to a force tending to rotate the device. In addition, the anti-theft device comprises a groove for the engagement of a complementary male projection provided on the actuating wrench. The bushing can be a blind one and in this case the groove is provided on an annular projection projecting radially relative to the bushing, or the bushing can be open at its top and in this case the groove is provided at the top of the device body, inside the open base of the bushing.

According to the invention, the cylindrical portion serving as a guide portion and possibly also as an engaging portion comprises a polygonal cross-section in which at least one face is concave relative to a transverse plane. Preferably, the polygon is a hexagon and all its six faces are concave. The concavity of the faces further has preferably a curved profile or a profile with two or more straight line segments in a transverse plane. Still according to the invention, a hollow cap is provided on the cylindrical guide or engaging portion. The cap is arranged as a coating around the cylindrical portion.

The cap is fixed to the cylindrical portion preferably by press-fitting. In addition, the cap may be secured to the cylindrical portion by gluing. Advantageously, according to the invention, the cap has an inner cross-section complementary to the outer cross-section of the cylindrical portion. The inner cross-section of the cap has therefore the shape of a polygon, in which at least one face of the polygon is convex relative to a transverse plane. Preferably, the polygon is a hexagon and all its six faces are convex. The convexity of the inner faces of the cap further preferably has a curved profile or a profile with two or more straight line segments. Said profile is preferably press-fitted with interference to the outer profile of the cylindrical portion with concave faces. Advantageously, according to the invention, the rotation torque applied to the cap is discharged on the concave face of the cylindrical portion, which consequently counters the rotation of the cap relative to the device body, thereby making the fastening of the cap more resistant even in particularly severe locking conditions. Indeed, at least one component of the forces applied tangentially with respect to a circumference centered in the axis of the nut or bolt, is applied, through the cap, perpendicularly to a part of the concave face of the guide portion.

The device can be made of any suitable material, but it will preferably be made of steel. The cap, in particular, will preferably be made of stainless steel. The cap is fixed to the body of the device preferably by interference press-fitting. An adhesive can be interposed between the cylindrical portion and the cap in order to improve fixing of the cap to the device. The cap can also have a base caulked to a collar of the device body. Externally, the cap can also have a cross-section different from the inner one and therefore be perfectly hexagonal with flat faces free from concavities, or it can have the same profile as the inner section and therefore have a concave cross-section.

BRIEF DESCRIPTION OF THE DRAWINGS

Some preferred embodiments of the invention will be described by way of non-limiting examples with reference to the annexed drawings, in which.

The same reference numerals have been used in all the figures for denoting the same or functionally equivalent components.

DETAILED DESCRIPTION

Figure 1:
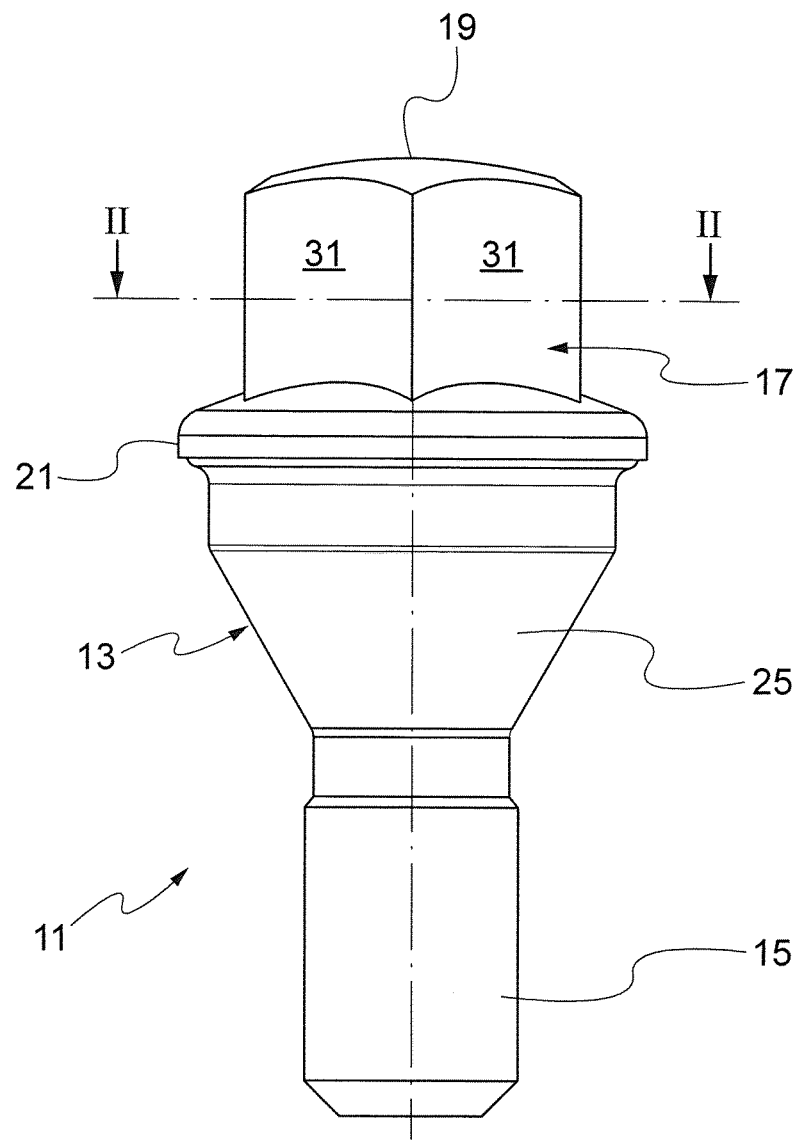
FIG. 1 is a side view of the device in a first embodiment, when made as a bolt.

Reference is made to FIG. 1, in which there is illustrated a first embodiment of the invention in which the device is made as a bolt 11. The bolt 11 comprises a body 13 provided with a threaded stem 15 and an engaging portion 17. The portion 17 is covered by a hollow cap 19. In the illustrated embodiment, the cap 19 is outwardly hexagonal, so that a fixed wrench of the hexagonal type can engage it. Between the stem 15 and the engaging portion 17, the body 13 further comprises an intermediate portion 25, which, in the shown example, is conical. The conical shape for the portion 25 is particularly indicated for applications of the device to vehicle wheels.

Figure 2A:
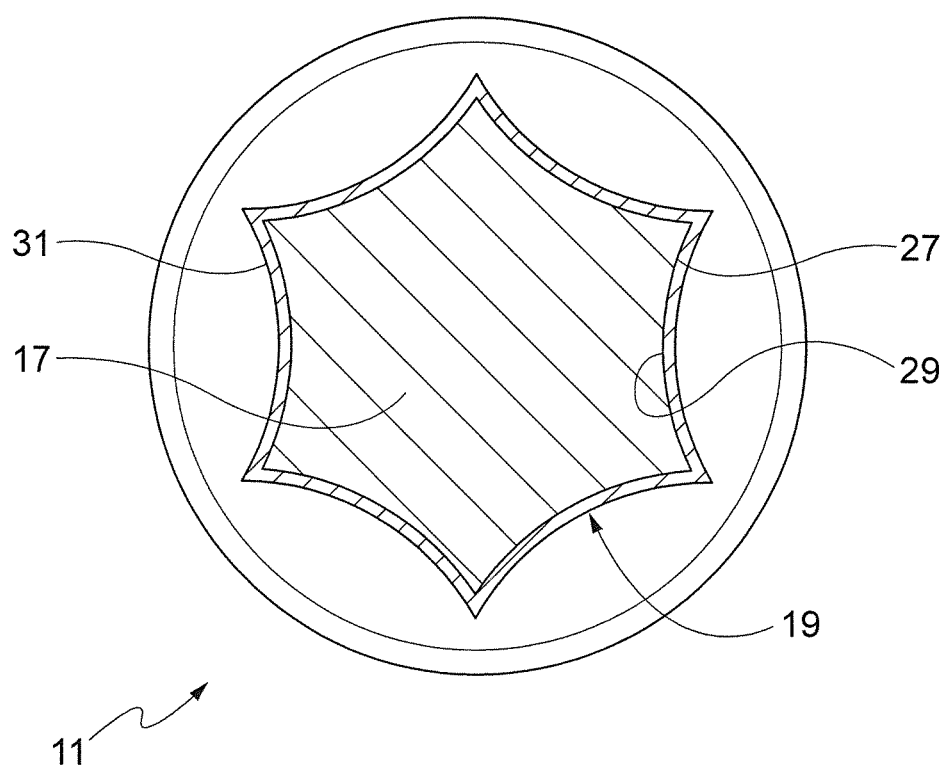
FIG. 2A is a cross-section taken along the line II-II of FIG. 1.

Referring to FIG. 2A, the faces 27 of the hexagonal engaging portion 17 are concave relative to a plane transverse to the longitudinal axis of the body 13. By contrast, according to the invention, the inner faces 29 of the cap 19 are convex in order to accommodate the concave shape of the faces 27. In this embodiment, the concavity of the faces 27 and the convexity of the faces 29 have a curved or arched profile towards the center. The profile is further substantially regular. In the illustrated example, the cap 19 has outer faces 31 with a concave cross-section depending on the convexity of the corresponding inner face 29. In other embodiments, the cap 19 has its outer faces 31 substantially flat, i.e. without concavities, and a substantially hexagonal cross-section. In this case, therefore, the thickness of the wall of the cap 19 will vary and will be larger at the center of the concavity of the faces 29.

Figure 2B:
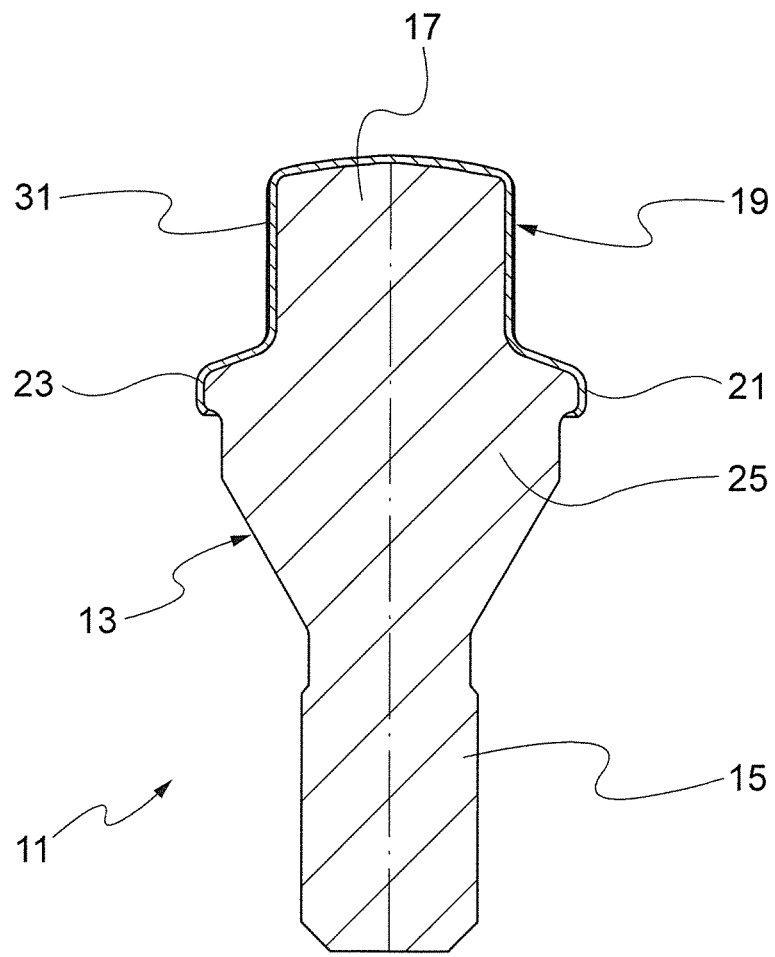
FIG. 2B is a longitudinal section of the device of FIG. 1.

Referring to FIG. 2B, the cap 19 further has a base 21 covering a collar 23 of the body 13. The base 21, in the illustrated example, is further caulked around said collar 23. According to the invention, an adhesive can be provided between the cap 19 and the portion 17 during manufacturing of the bolt 11. The adhesive is of a known type suitable for the materials of which the body 13 and the cap 19 are made, and is intended for giving more stability to the fixing of the cap 19 to the portion 17.

Figure 2C:
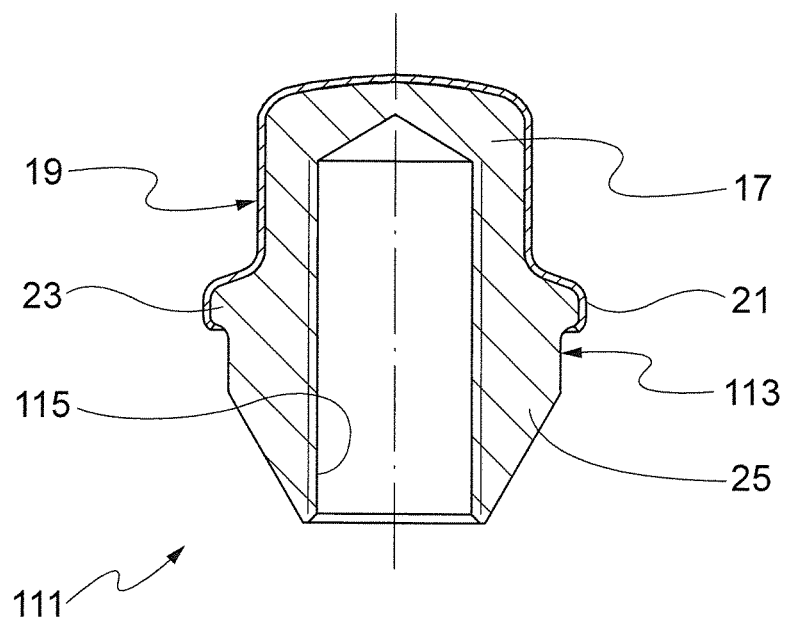
FIG. 2C is a longitudinal section of the device of FIG. 1, when made as a nut.

Referring to FIG. 2C, there is illustrated a device according to the invention, when made as a threaded nut 111. The nut 111 comprises a body 113 provided with an axial threaded bore 115. Similarly to the version made as a bolt, the engaging portion 17 of the body 113 is further covered by a cap 19.

Figure 3:
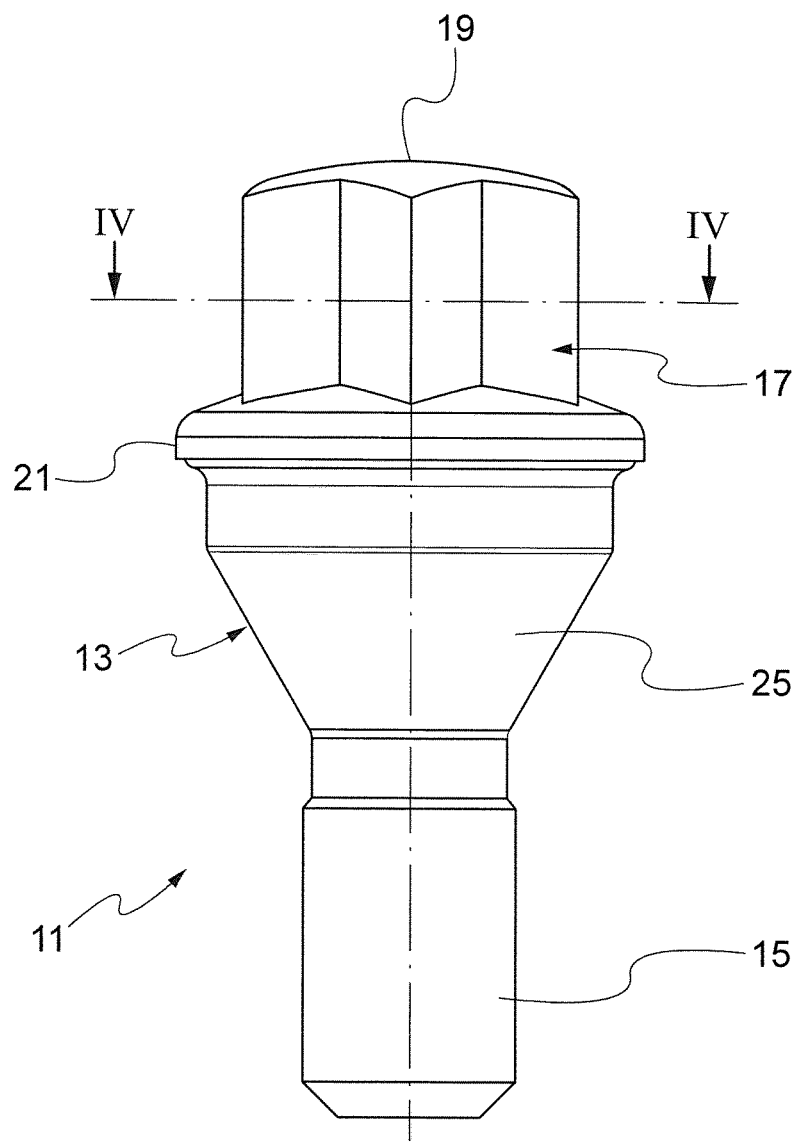
FIG. 3 is a side view of the device in a second embodiment, when made as a bolt.
Figure 4:
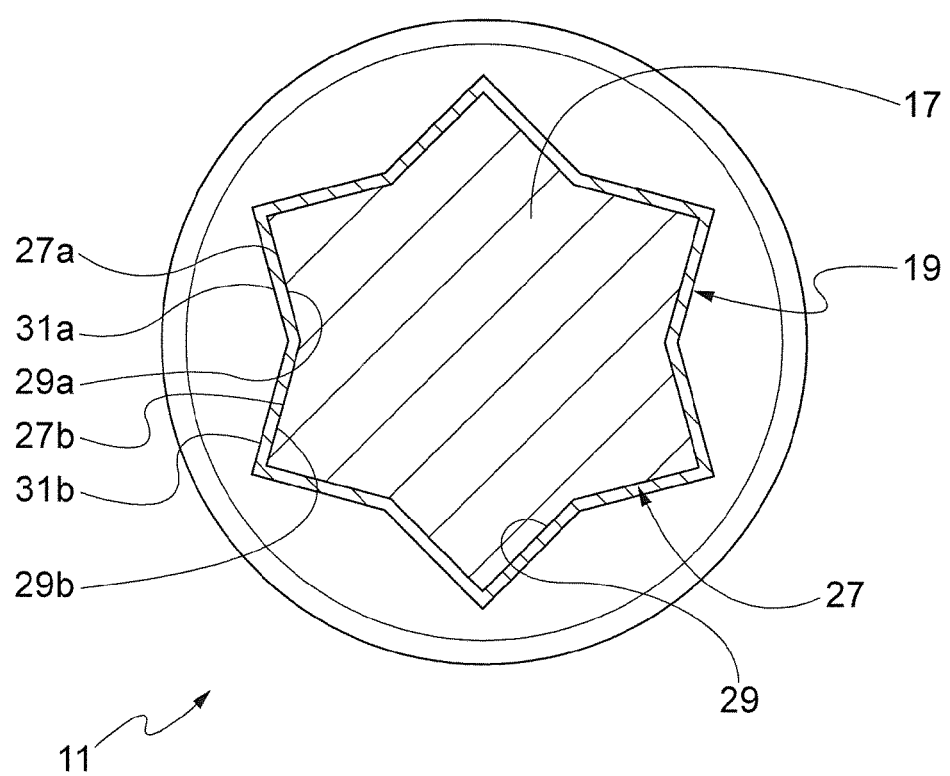
FIG. 4 is a cross-section taken along the line IV-IV of FIG. 3.

Referring now to FIGS. 3 and 4, there is illustrated a bolt 11 in which the engaging portion 17 has a hexagonal cross-section having concave faces 27, the concavity of the faces 27 having a profile with straight line segments. The cross-section of the portion 17 therefore has a hexagonal main shape, in which the six faces of the hexagon are convex and each of said faces defines a pair of faces 27a, 27b incident inwards substantially to the center of the face 27. Overall, therefore, the cross-section of the engaging portion 17 has substantially twelve sides.

In this embodiment, the cap 19 has its inner convex faces 29 defined by two faces 29a, 29b and the outer section of the cap reproduces the concavity of the portion 17 with faces 31a, 31b incident inwards substantially to the center of each face 31 of the hexagon.

In the annexed figures, the concavity has been shown exaggerated in order to make it perceivable to the observer; however, according to the invention, it is provided that the concavity may also be smaller than the illustrated ones.

Figure 5:
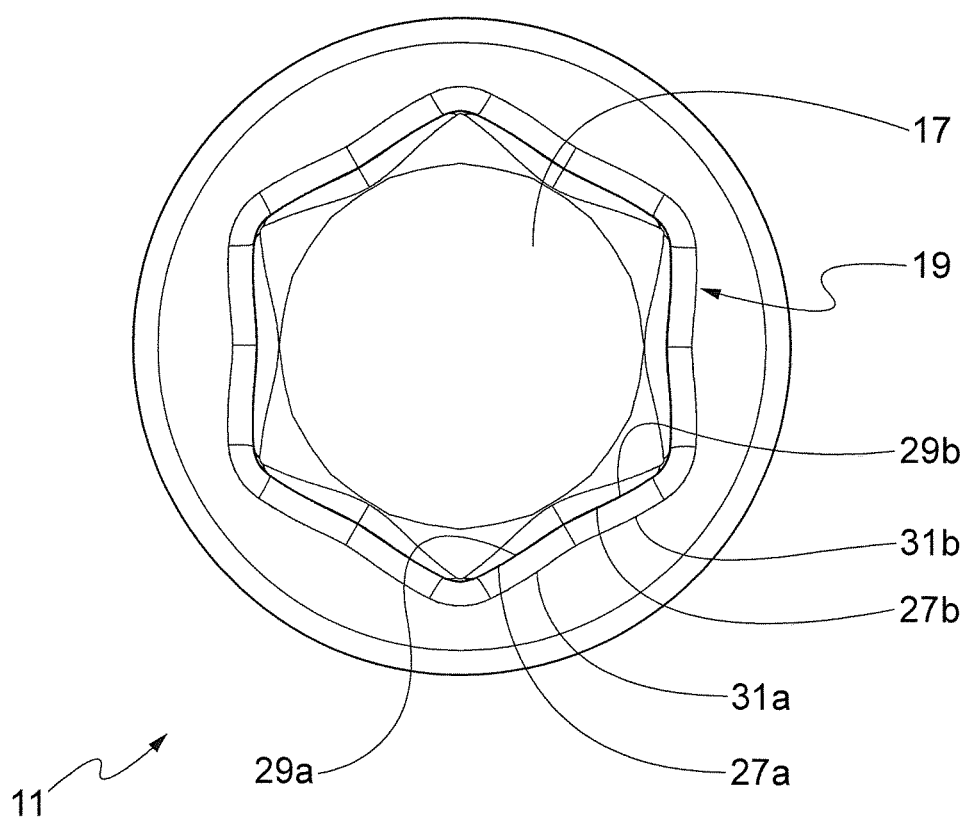
FIG. 5 is a cross-section of a locking device according to a variant of the second embodiment.

Referring to FIG. 5, there is illustrated a variant of the second embodiment in which the faces 27a, 27b of the engaging portion 17 are slightly angled relative to each other. In this embodiment, the cap 19 has its inner convex faces 29 defined by two faces 29a, 29b and the outer section of the cap reproduces the concavity of the portion 17 with faces 31a, 31b incident inwards substantially to the center of each face 31 of the hexagon.

Figure 6:
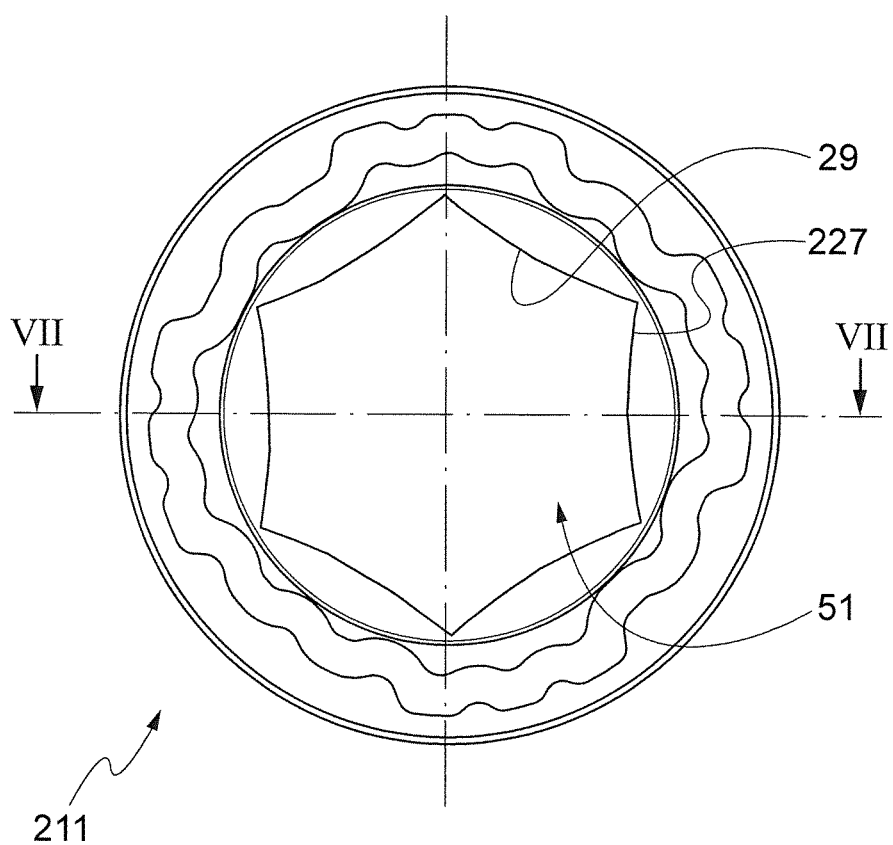
FIG. 6 is a cross-section of the device according to the invention, when made as an anti-theft nut.
Figure 7:
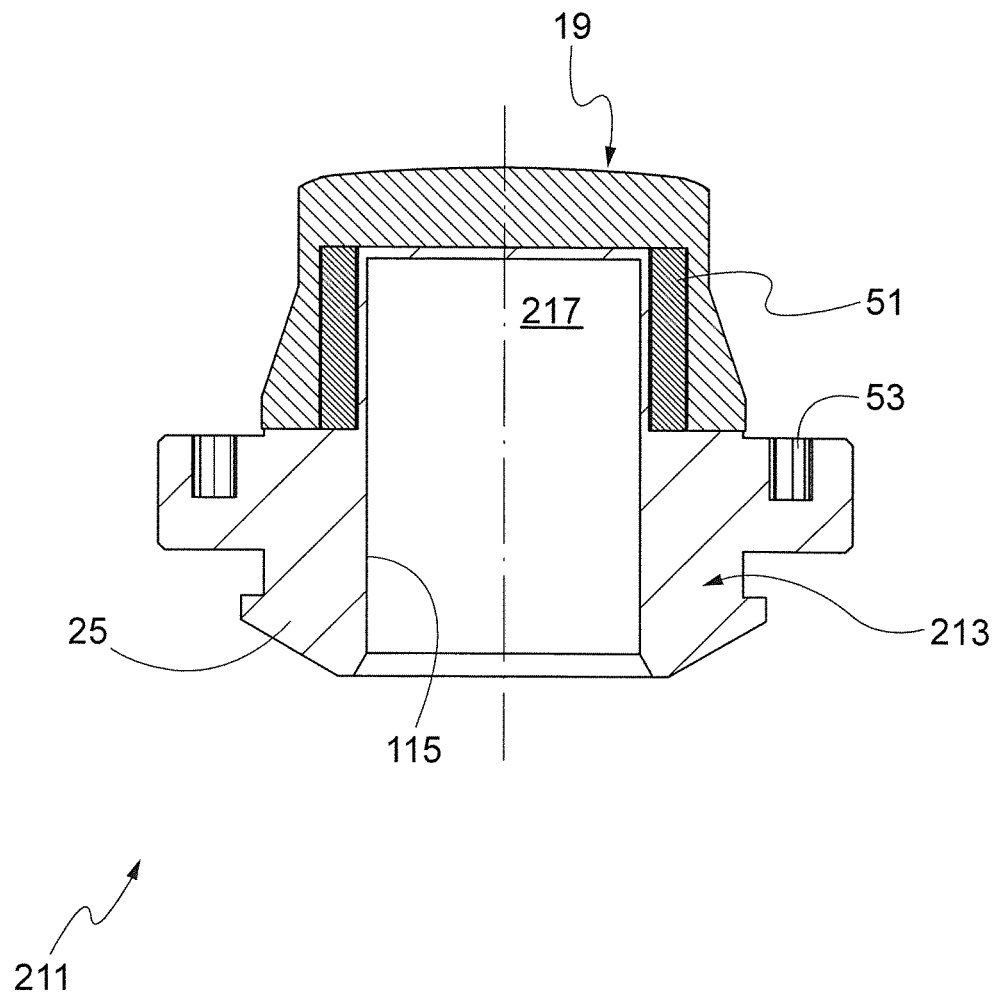
FIG. 7 is a longitudinal section along the line VII-VII di FIG. 6.

Referring now to FIGS. 6 and 7, there is illustrated the device according to the invention, when made as an anti-theft nut 211. In this embodiment, the body 213 includes a guide portion 217 externally provided with an anti-theft bushing 51. The bushing 51 has a hexagonal cross-section. The six faces 227 of the bushing 51 are further concave in a transverse plane. A hollow cap 219 is provided on the bushing 51. The inner cross-section of the cap 219 is hexagonal and the six faces 29 of the hexagon are convex relative to a transverse plane. According to this embodiment, the cap 219 is fixed to the bushing 51 and is preferably free with respect to the body 213 of the device. The bushing 51 must in fact be preferably free to rotate relative to the body 213. The torque applied to the bushing 51 in a possible theft attempt should not in fact cause rotation and consequent loosening of the body 213 from the stud in which it is locked. The guide portion 217 may possibly be made so as to be fragile upon radial compression. In this case, the bushing 51 may be fixed to the portion 217, as the torque applied to the bushing 51 in a possible theft attempt determines breaking of the portion 217 with the consequent impossibility of rotation and consequent loosening of the body 213. In this embodiment, the cap 219 is preferably free of caulking with respect to the body 213. The body 213 further includes an engaging groove 53 for an actuating wrench (not shown), which will be equipped with a projection complementary to the groove 53. The actuating wrench is guided to engage with the groove 53 by the guide portion 217.

The device as described and illustrated is susceptible to several variations and modifications, falling within the same inventive principle.

We claim:

1. Locking device made as a nut provided with an axial threaded seat or bore or as a bolt provided with a cylindrical axial threaded stem, comprising a body in which a guide portion is defined, wherein an anti-theft bushing is provided on the guide portion and a hollow cap is provided on the anti-theft bushing, the anti-theft bushing being capable of rotating or breaking when the anti-theft bushing is exposed to a torque tending to unlock the locking device, wherein the anti-theft bushing comprises at least one face which is concave relative to a transverse plane and in that the hollow cap comprises in its inside at least one complementary convex face, and wherein there is further provided an engaging slot on the body of the locking device for a complementary wrench provided with an engaging projection.

2. Locking device according to claim 1, wherein the anti-theft bushing has a hexagonal cross-section and wherein the cap has a complementary hexagonal inner cross-section and wherein the six faces of the anti-theft bushing are concave relative to a transverse plane and the inner faces of the cap are convex relative to a transverse plane.

3. Locking device according to claim 2, wherein the cap has a hexagonal outer cross-section and wherein the faces of the hexagon are convex.

4. Locking device according to claim 2, wherein the cap has a hexagonal outer cross-section and wherein the faces of the hexagon are flat.

5. Locking device according to claim 1, wherein the concavity of the faces of the anti-theft bushing has a curved profile in a transverse plane.

6. Locking device according to claim 1, wherein the concavity of the faces of the anti-theft bushing has a profile with straight line segments in a transverse plane.

7. Locking device according to claim 1, wherein the cap is glued to the anti-theft bushing.

8. Locking device according to claim 1, wherein the body of the device is made of steel and the cap is made of stainless steel.

* * * * *